H. P. MACDONALD.
FLEXIBLE JOINT.
APPLICATION FILED MAY 17, 1919.

1,376,107.

Patented Apr. 26, 1921.
3 SHEETS—SHEET 1.

WITNESS
Gustav Genzlinger

INVENTOR.
H. P. Macdonald.
by Synnestvedt & Lechner
attys.

H. P. MACDONALD.
FLEXIBLE JOINT.
APPLICATION FILED MAY 17, 1919.

1,376,107.

Patented Apr. 26, 1921.
3 SHEETS—SHEET 2.

WITNESS

INVENTOR.

H. P. MACDONALD.
FLEXIBLE JOINT.
APPLICATION FILED MAY 17, 1919.
1,376,107.
Patented Apr. 26, 1921.
3 SHEETS—SHEET 3.
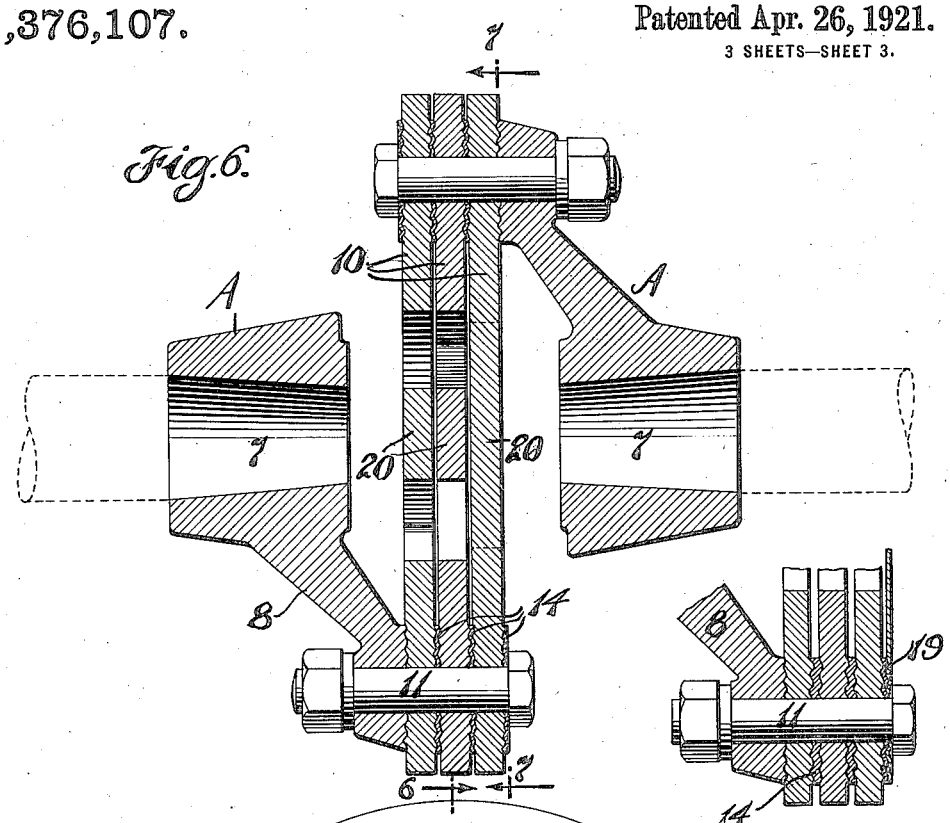
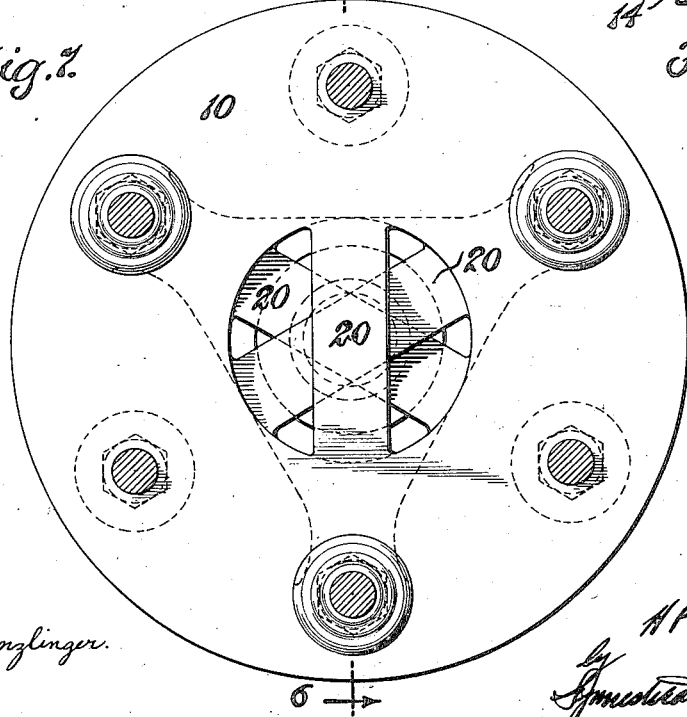
WITNESS
Gustav Genzlinger.
INVENTOR.
H P Macdonald

UNITED STATES PATENT OFFICE.

HARRY P. MACDONALD, OF MONTCLAIR, NEW JERSEY, ASSIGNOR TO THE SNEAD & CO. IRON WORKS, OF JERSEY CITY, NEW JERSEY, A CORPORATION OF NEW JERSEY.

FLEXIBLE JOINT.

1,376,107.           Specification of Letters Patent.     Patented Apr. 26, 1921.

Application filed May 17, 1919. Serial No. 297,779.

*To all whom it may concern:*

Be it known that I, HARRY P. MACDONALD, a citizen of the United States, residing at Montclair, in the county of Essex and State of New Jersey, have invented certain new and useful Improvements in Flexible Joints, of which the following is a specification.

This invention relates to flexible joints, and particularly to flexible or universal joints suitable, for example, in automotive driving assemblies.

Difficulties arise in the use of flexible disks for universal joints particularly when the disks become deformed in service from softening and the development of weak spots, etc., as a result of which the parts connected come to revolve about other than their true centers, setting up centrifugal forces which not only may destroy the disks, but also develop fractures in the parts connected from the whipping action which takes place.

It is the primary object of my invention to overcome the foregoing difficulties and this I accomplish by the provision of an improved joint so designed that the parts connected will rotate about their true centers while at the same time a full measure of flexibility is maintained in the joint.

Figure 1:
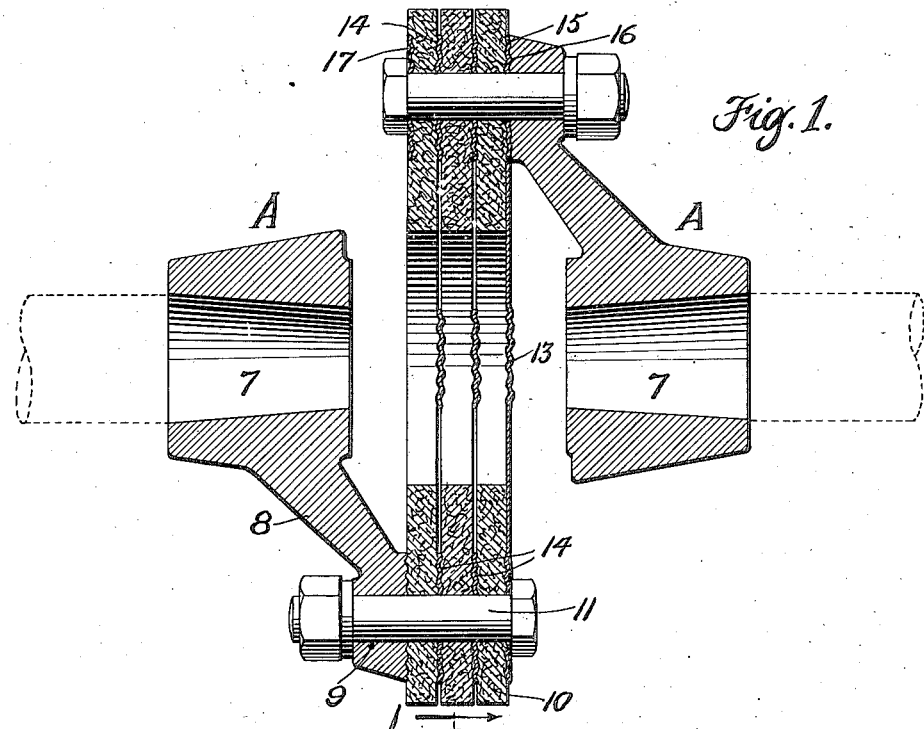
Figure 2:
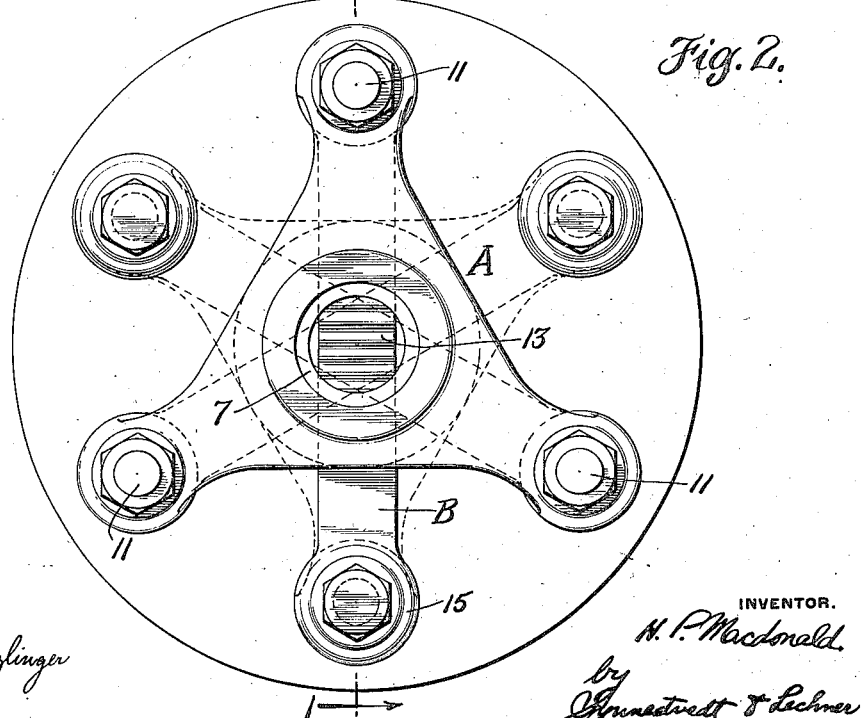
Figure 3:
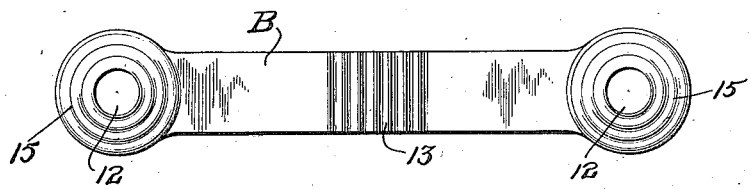
Figure 4:
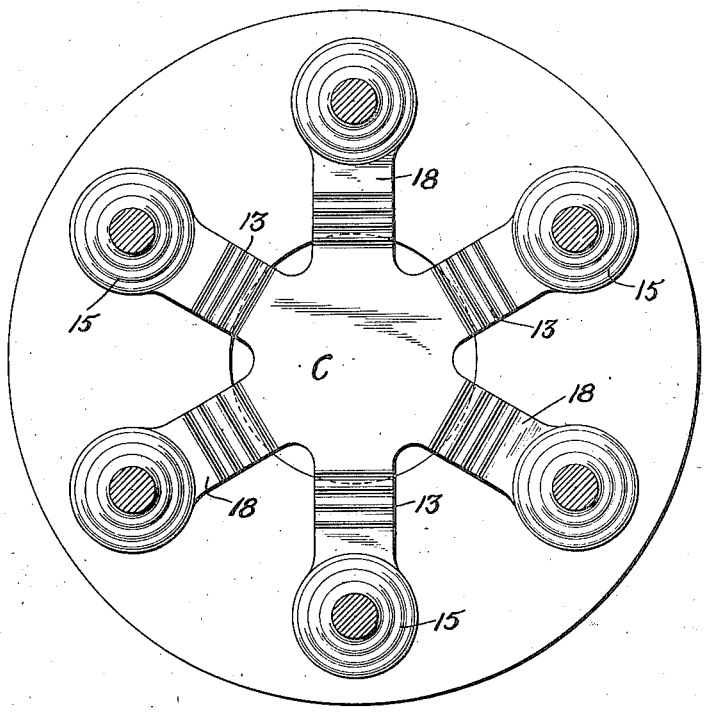

I accomplish the foregoing, together with such other objects as may hereinafter appear, or are incident to my invention, by means of a construction which I have illustrated in preferred form in the accompanying drawings, wherein:

Figure 1 is a cross section through a joint embodying my improvements, taken on the line 1—1 of Fig. 2; Fig. 2 is an end elevation of the joint; Fig. 3 is a plan view of a detail of my invention; Fig. 4 is a plan view of a modification of my invention; Fig. 5 is a sectional detail of a modification of my invention; and Figs. 6 and 7 are views showing another modification of my invention, Fig. 6 being a section taken on the line 6—6 of Fig. 7 and Fig. 7 being a section taken on the line 7—7 of Fig. 6.

Flexible and universal joints of the general character to which this invention relates, are usually made up with two metal spiders, each having a plurality of arms (usually 3 in number) bolted on opposite sides of two or more flexible disks, the bolt holes being spaced 60° apart, and the arms of each spider being spaced opposite the center spaces of the spider on the other side of the disk. In the drawings, I have illustrated my invention as applied to such a three-armed spider arrangement.

Referring now to Figs. 1 and 2 particularly, the spiders are designated as a whole by the reference letter A, each spider being provided with a socket or apertured portion 7, for the reception of the shaft or other parts to be connected, and with the spider arms 8, each of which has a bolt hole 9 formed therein. The arms of the spiders are coupled or joined by a plurality of flexible disks 10, composed of leather or other suitable material, the disks being secured to the respective arms by bolts 11.

As a preferred means for preventing the tendency of the parts to get out of line, *i. e.* to rotate about other than their true centers, I employ three connecting members B, composed of suitable material, such for example, as metal strips having at each end a bolt receiving aperture 12, and corrugated in the center, if desired, as indicated at 13. These strips are bolted between the radially opposed legs of the spiders by means of the bolt 11, the strips being preferably placed on opposite sides of the disks 10 so that they will not rub against one another as the disks flex. By this arrangement the center distance between spider arms will be kept constant and the parts maintained in alinement, while at the same time the strips will permit of the slight elongation which may be necessary when there is end play or considerable angularity in the joint. Since each bolt passes through but one strip, and since the strips are placed on opposite sides of the disks, I provide spacing washers 14 of the same thickness as the end portions of the strip in order that the disks may not be distorted when the bolts are drawn up.

In order to distribute the stresses over the widest possible area, I corrugate the ends of the strips, as indicated at 15, and also corrugate the washers 14. I also corrugate the faces of the arms as at 16 in Fig. 1 so as to fit the corrugated ends of the strip engaged by such faces or to tightly grip the flexible disks, as the case may be. To prevent the bolt head from biting into the flexible disks, I provide washers 17, which are similarly corrugated for the purpose specified.

In some cases it may be desirable to substitute for the three connecting strips above described, a single member C in the form of a spider having the desired number of arms 18 connected to radially opposed spider arms 8 in the manner previously described. The arms 18 of this modified arrangement are corrugated as before at 13 to permit slight elongation and are also corrugated as at 15 as before, in order to grip the flexible disks over a wide area for the purpose of distributing the stresses.

In addition to the foregoing advantages, it will be noted that the improvements will tend to greatly lengthen the life of such joints. The device is simple and economical to manufacture, and the parts can be readily assembled and replaced.

In some cases it may prove desirable to space the strips B or the members C away from the leather disks to prevent chafing, and for this purpose I provide thin washers 19, as indicated in Fig. 5. Where this arrangement is employed it will be obvious that the washers 14 must be increased in thickness so as to correspond with the combined thickness of the strips and the washers 19.

It will be apparent that it may also be desirable to incorporate or combine the radial connecting members with the disk members circumferentially connecting the spiders, and one exemplification of this modification of my invention is illustrated in Figs. 6 and 7, from inspection of which it will be seen that I have so cut the leather disks as to leave a central bridge or tie piece 20. When three disks formed in this manner are placed so that the tie pieces are disposed at angles of 60° to each other, the same effect is obtained as in the previous structures described.

The modified construction would still combine the advantages of great flexibility which it is impossible to obtain in a solid disk, i. e. a disk which has no hole in the center, with the prevention of distortion of the disks which causes the parts of the assembly to rotate on other than their true centers.

I claim:

1. A flexible joint of the character described comprising in combination a pair of opposed members, flexible disk like means coupling said members, and means forming part of the disk preventing said members from rotating out of their true centers and sufficiently elastic to take care of angularity or end motion in the joint.

2. A flexible joint of the character described comprising in combination a pair of opposed members, a flexible coupling means coupling said members together, and means connected to each of said members and adapted to prevent the same from rotating out of true center and sufficiently elastic to take care of angularity or end motion in the joint.

3. A flexible joint of the character described comprising in combination a pair of opposed members, a flexible coupling interposed therebetween and secured to the respective members at radially opposed points, and means connecting said members at radially opposed points tending to prevent rotation of the same out of true center.

4. A flexible joint of the character described comprising in combination a pair of opposed members, a flexible disk interposed therebetween and connected to the respective members at a plurality of radially opposed points, and means directly connecting said members between radially opposed points.

5. A flexible joint of the character described comprising in combination a pair of opposed members, having a plurality of arms, respectively arranged in off-set relation, a flexible disk-like coupling secured to said arms, and means directly connecting said members at a plurality of radially opposed points.

6. A flexible joint of the character described comprising in combination a pair of opposed members, having a plurality of arms, said arms respectively off-set with respect to one another, a flexible disk-like member secured to said arms, and a plurality of connecting members connecting said opposed members directly at radially opposed points.

7. A flexible joint of the character described comprising in combination a pair of opposed members, a plurality of disk-like members interposed therebetween and connected thereto at a plurality of spaced points, and a plurality of members directly connecting said opposed members at a plurality of radially opposed points, said connecting members being interposed between said disk-like members.

8. A flexible joint of the character described comprising in combination a pair of opposed members, a flexible disk-like member coupling the same and circumferentially secured thereto, and a second means, radially disposed, coupling said members and sufficiently elastic to take care of angularity or end motion in the joint.

9. A flexible joint of the character described comprising in combination a pair of opposed members, a flexible disk-like member coupling the same and circumferentially secured thereto, and a second means, radially disposed, coupling said members, said last means being flexible and sufficiently elastic to take care of angularity or end motion in the joint.

10. A flexible joint of the character described comprising in combination a pair of opposed members, and a compound coupling therebetween, said coupling being secured circumferentially to said members to provide a flexible driving connection therebetween, and secured radially thereto at a plurality of opposed points to maintain alinement and sufficiently elastic to take care of angularity or end motion in the joint.

11. A flexible joint of the character described comprising in combination a pair of opposed members, and a compound flexible coupling therebetween, said coupling connecting said members circumferentially and also radially and sufficiently elastic to take care of angularity or end motion in the joint.

12. A flexible joint of the character described comprising in combination a pair of opposed members, and a compound coupling means therebetween, said means connecting said members circumferentially for driving purposes and radially for relative positioning purposes and sufficiently elastic to take care of angularity or end motion in the joint.

13. A flexible joint of the character described, comprising in combination a pair of opposed members, a flexible coupling means coupling said members together, and means rigidly attached to said members and adapted to prevent the same from rotating out of center, said means being sufficiently elastic to allow for angularity or end motion in the joint.

In testimony whereof, I have hereunto signed my name.

HARRY P. MACDONALD.